July 6, 1965
A. B. SHOWALTER
3,193,226
SNAP-IN FASTENER FOR MOUNTING OPENING
Filed Sept. 20, 1961
2 Sheets-Sheet 1
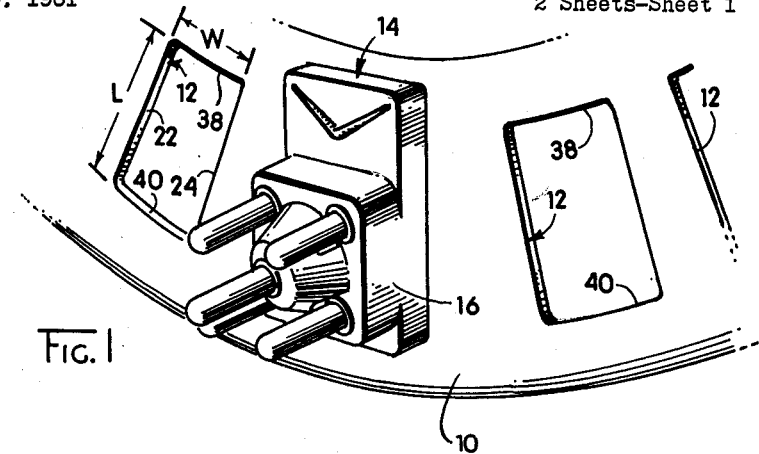
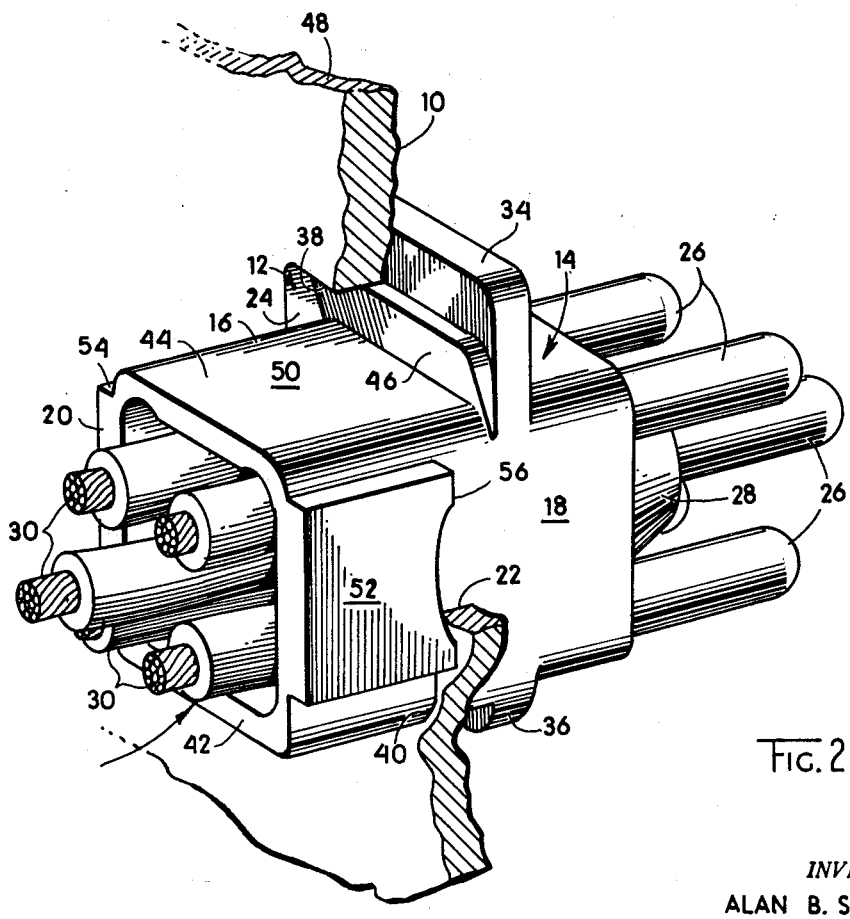
INVENTOR.
ALAN B. SHOWALTER
BY Albert L. Jeffers
ATTORNEY United States Patent Office 3,193,226
Patented July 6, 1965

3,193,226
SNAP-IN FASTENER FOR MOUNTING OPENING
Alan B. Showalter, Albion, Ind., assignor to
Lyall Electric, Inc., Albion, Ind.
Filed Sept. 20, 1961, Ser. No. 139,438
2 Claims. (Cl. 248—27)

This invention relates to a fastener construction and method of mounting such fastener by means of a locking arrangement which permits the fastener to be readily attached and detached from its mounting structure.

One of the objects of the present invention is to provide a male plug snap-in fastener which is constructed of a substantially inflexible thermosetting resin having portions which permit the fastener to be readily locked in place by a series of manipulations which tightly engage the fastener within the mounting structure and retain it against accidental dislodgement.

A further object of the invention is to provide a novel male plug snap-in construction which is readily manufacturable and which includes integral portions which are adapted to form a mechanical lock and thereby hold the plug in its proper location, but is not subject to breakage or loosening until manipulated in a specific manner to break the connection.

Another object of the invention is to produce a male plug snap-in fastener which can be quickly assembled and lends itself, by virtue of the simplified assembly method, to a speedy assembly procedure. The process thus lends itself to a mass-production technique, reducing the cost of mounting the plugs over prior methods of assembly.

Another object of the invention is to provide a male plug snap-in fastener which can vary considerably in dimension to be of any size appropriate to its mounting opening. The fastener has the advantage of being interchangeable to some extent with different sized openings provided the mounting portions are proportionately changed.

It is an important feature of the present invention that a relatively inflexible material such as a phenolformaldehyde resin or the like can be so constructed that it will be suitable as a snap-in fastener, it being generally thought that only resilient construction materials were suitable for this type fastening. Yet, it will be seen that in the present invention a snap-in fastening can be provided with a relatively inflexible material of construction, and which will maintain a rigid connection with the supporting structure and is not subject to breakage because the connection is dependent on a flimsy, inadequate portion of the fastener structure. This feature of the invention is of itself a considerable advance in this art, and the present invention combines with that feature the further feature of ready removability of the fastener by means of a simple procedure which can be utilized when required.

Other objects and features of the invention will become apparent from a consideration of the following description, which proceeds with reference to the accompanying drawings wherein:

FIGURE 1 is an isometric view showing one of the male plug snap-in fasteners shown attached to a mounting structure, which in this case is a motor end bell. Other openings of the end bell are shown and are likewise adapted to receive a snap-in fastener therein;

FIGURE 2 is an enlarged isometric view of the snap-in fastener shown in FIGURE 1, but looking in the opposite direction of the fastener and with a portion of the end bell broken away to illustrate the connection more clearly;

Figure 3:
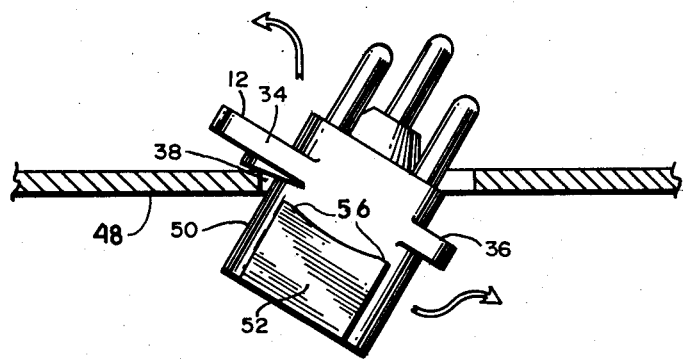
FIGURE 3 illustrates the snap-in fastener while it is partially assembled to the end bell of the motor.

Referring now to the drawings, there is shown a fragmentary view in FIGURE 1, an end bell 10 of the motor (not shown) which is provided with a number of circumferentially spaced mounting openings 12 of rectangular outline. Fitted within one of these openings 12 is a snap-in fastener designated generally by reference numeral 14 and one of which is shown installed in FIGURE 1. The snap-in fastener is constituted by a rectangular cross section body 16 having a width which corresponds substantially to the width dimension of the opening 12 and labeled W in FIGURE 1, so that when the snap-in fastener is located in place, the side 18 and side 20 opposite thereto engage the corresponding edges 22 and 24 to prevent turning of the fastener 14. The fastener plug includes a number of integrally constructed electrical conductors 26 and a centrally constructed boss 28 which receive electrical conductors 30 therein connected to suitable parts of the motor.

The body of the plug fastener can be constructed of non-conducting material such as a thermosetting phenolformaldehyde resin or the like. Mention is made of this material, not in a limiting sense, but only to indicate that the invention is sufficiently versatile in its application so that still non-resilient rigid materials can be used for constructing the fastener as well as resilient materials. Thus, the invention provides a wide selection of material which is best suited according to the economics and application of the particular situation.

There is integrally constructed with the body 16 two projections 34 and 36 which overlie edges 38 and 40, respectively, of the opening. The edges 38 and 40 of the opening are spaced by an amount labeled L in FIGURE 1 which is greater than the dimension of the rectangular fastener from side 42 to side 44, the greater dimension L of the opening 12 permitting the fastener to be tilted so that the projection 34 and lip 46 can be passed upwardly from side 48 of the end bell 10 as shown in FIGURE 3, so that the edge 38 of the opening will engage the rectangular body in the area 50.

Figure 4:
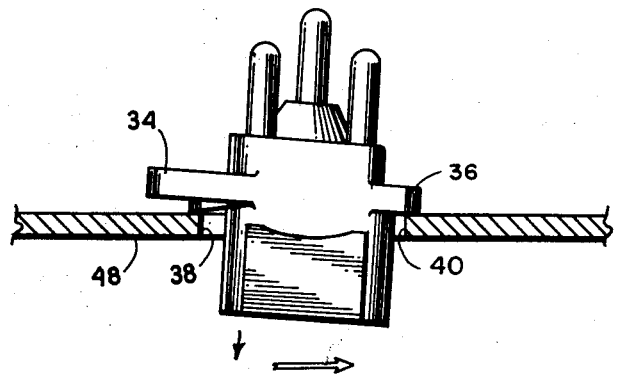
FIGURE 4 illustrates the snap-in fastener as it is being assembled to the end bell of a motor just prior to force-fitting the lip of the fastener in place.

The plug-in fastener is then rotated about edge 38 so that projection 36 moves through the opening 12, the direction of turning of the plug-in fastener being in the direction of the line and arrow shown at the top in FIGURE 3, and the fastener is then caused to slide horizontally in the direction of the line arrow shown at the bottom in FIGURE 3 and FIGURE 4.

The position of the snap-in fastener is thus changed from FIGURE 3 to FIGURE 4 wherein projection 34 overlies edge 38 and projection 36 overlies edge 40 of the opening 12. The abutments 52 and 54, integrally constructed with the snap-in fastener, are spaced in relation to the projections 34, 36 so that their edges 56 engage surface 48 to limit movement of the snap-in fastener through the opening 12 in one direction. As shown in FIGURE 2, the plug is held against movement perpedicularly to the plane of the end bell. The plug is then locked in place by applying pressure horizontally in the direction of the horizontal arrow and then applying pressure in the direction of the vertical arrow in FIGURE 4 to push the lip 46 within the opening 12 and in gripping relation with edge 38 of the opening 12. In the process of this occurring, the side 42 is nested firmly against edge 40 of the opening, and the plug is, therefore, positively retained about edges 22, 40 and 24 by engagement with sides 18, 42 and 20 of the plug while edge 38 of the opening is gripped by the lip 46.

The plug-in fastener is thus held firmly against movement in and out of the opening, perpendicularly to the plane of a bell by the projections 34, 36 in one direction and by the lugs 52, 54 in the opposite direction. The plug is retained circumferentially of the bell by engagement of sides 16 and 18 with their complementary edges 22 and 24 constituting the edges of the opening 12, and the plug is held radially at one side by engagement of side 42 with edge 40 of the opening 12 and engagement of the lip 46 with the edge 38. The plug cannot be rotated because it is engaged along the three edges 22, 40 and 24.

The plug-in fastener, when it is finally assembled, is held tenaciously in place and is not easily dislodged. It will be noted that the fastener does not depend on any portion which is readily subjected to overstraining which would cause it to snap off. The fastener will stay in place indefinitely and can readily withstand all of the strains which are normally incidental to motor application.

When it is required to remove the fastener for servicing the motor or for any other purpose, I apply pressure along the edge of the side 42 at the location and in the direction indicated by a line and arrow in FIGURE 2, and there is sufficient tolerance in the fitting of the body 16 within opening 12, especially along the corners of the body, to allow a slight tilting of the body to lift the lip 46 upwardly to the position shown in FIGURE 4, this taking place by a sudden "snap" action, just as occurred when it was inserted in place, and it is then possible to tilt the fastener from the position shown in FIGURE 4 to that of FIGURE 3 by first moving the fastener toward the left in FIGURE 4 and then tilting it clockwise to the position shown in FIGURE 3 until the projection 36 clears edge 40 and is rotated out of the opening 12, and the projection 34 is then withdrawn through opening 12.

From the foregoing description, it is clear that numerous modifications can be made of the invention without departing from the principles thereof. For example, the material of construction can be changed however desired and according to the particular design requirement and application of the invention. Also, the dimensions and shape of the fastener can be varied so that the entire cross section of the body can be as large around as the lugs 52, 54.

Also, the invention is by no means limited to usage with a motor wherein the fastener is secured to an end bell. It is also possible to use this type of plug-in with a snap-in feature on lampholders, female plugs and the like.

Accordingly, although the invention has been disclosed in connection with a single example embodiment, it is intended that such revisions and adaptations of the invention as can be made by those skilled in the art to meet individual requirements will be included within the scope of the following claims, wherever such revised and modified structure incorporates the herein disclosed principles and constitutes, therefore, an equivalent of the present invention.

I claim as my invention:

1. A fastener comprising a rectangular cross-section body of rigid construction and including an integral first projection which is proportioned to fit through a companion rectangular opening in a mounting member at an inclined angle of said fastener and providing a surface which overlies one edge of said opening, the width of said rectangular opening being substantially the same as the width of said rectangular cross-section body, a second projection of said body which is proportioned for movement through said opening and also providing a surface which overlies opposite edge of said opening, means forming abutments which are located in overlying relation with the side edges of said opening, and engageable with the other side of the mounting member and means forming a lip on the first projection which is movable within said opening to effect an interference gripping fit.

2. A fastener comprising a rigid substantially inflexible fastener of rectangular cross section comprising means forming a first projection along one side of said fastener, a mounting member having a rectangular opening with a width corresponding substantially to the width of said fastener, said fastener being inclinable to move said projection through the opening in an inclined position and thereafter turned to bring said projection into overlying relation with the front edge of said opening, means forming a second projection on said fastener which is movable through the opening and overlies the opposite edge of said opening, means forming abutment surfaces on said fastener and located in overlying relation with the two edges defining the width of said opening and engageable with the other side of said mounting member and means providing a lip on said first projection which is force-fitted within said opening to fill the opening and constrain movement of the fastener which is thereby mounted by said abutments and said projections against movement.

References Cited by the Examiner

UNITED STATES PATENTS

| | | | |
|---|---|---|---|
| 2,780,791 | 2/57 | Morschel | 339—198 |
| 2,891,103 | 6/59 | Swengel | 339—126 |
| 2,922,139 | 1/60 | Ustin | 339—198 |
| 2,927,956 | 3/60 | Reisch | 174—138 |

JOSEPH D. SEERS, *Primary Examiner.*